M. B. TITMAN.
Refrigerator and Water-Cooler Combined.

No. 221,983.  Patented Nov. 25, 1879.

Attest:
Thos. S. Crane.
J. E. Drake

Inventor,
Michael B. Titman
By O. Drake, Atty.

UNITED STATES PATENT OFFICE.

MICHAEL B. TITMAN, OF NEWARK, NEW JERSEY.

IMPROVEMENT IN REFRIGERATOR AND WATER-COOLER COMBINED.

Specification forming part of Letters Patent No. 221,983, dated November 25, 1879; application filed April 18, 1879.

*To all whom it may concern:*

Be it known that I, MICHAEL B. TITMAN, of the city of Newark, in the county of Essex and State of New Jersey, have invented certain new and useful Improvements in Refrigerator and Water-Cooler Combined; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention combines both a refrigerator and a water or milk cooler.

My object is, first, to have the water or milk tank removable; second, to have the ice at all times bear snugly against said water or milk tank; third, to secure a thorough circulation of cold dry air around said tank and in the refrigerator; and, fourth, to provide a waste-water receptacle inside of said refrigerator, thereby avoiding the necessity and inconvenience of preparing or using a separate vessel underneath, as is usual.

The invention consists in the combination, with the receptacle A, ice-chamber c, and waste-water receptacle D, of the removable water or milk tank B, one side of which forms a wall of the ice-chamber, and the inclined bottom or rack C, both being so adjusted and arranged with relation to each other and the remaining parts as to secure communication both at the top and bottom of the ice-chamber, between the latter and the said main receptacle, thereby allowing a free circulation of cold dry air throughout the refrigerator and around the water-tank B, the inclined bottom being arranged and adjusted so as to cause the ice to rest snugly up against the side of the water-tank, and cause the drippings from the ice to fall into the waste-water receptacle D beneath the ice-chamber, all as hereinafter more fully set forth and described.

Figure 1:
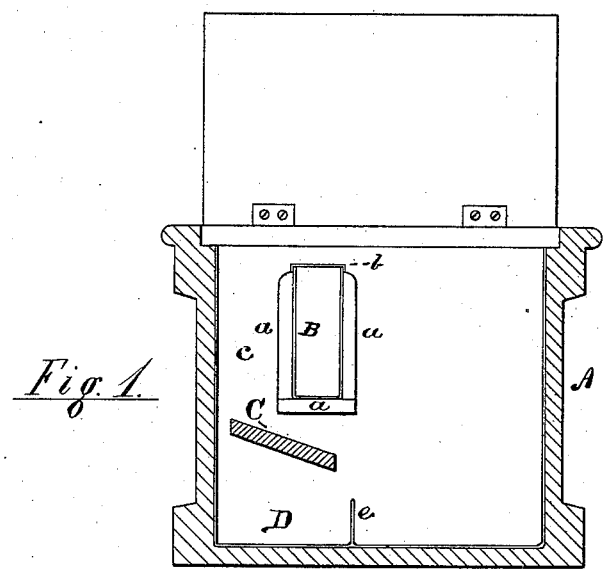
Figure 2:
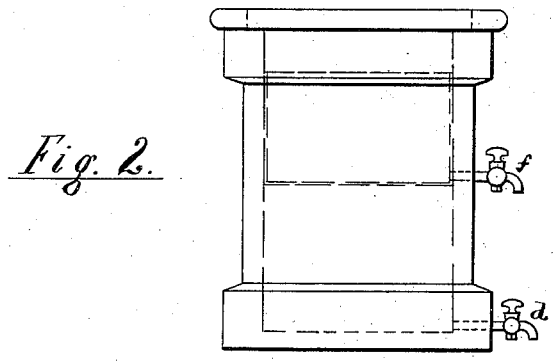

The accompanying drawings illustrate the nature of the invention, in which Figure 1 represents a central longitudinal vertical section of a refrigerator embodying my improvements, and Fig. 2 an end elevation of the same.

Similar letters of reference indicate corresponding parts in each figure.

Under my improvements I combine with the box A a removable water or milk tank, B, provided with a cover, b, a sufficient space being left between the top of said tank and the lid of the box A to allow a free circulation of air. Suitable cleats a are secured to the sides of the box to receive and support the tank, all as indicated in Fig. 1.

A chamber, c, is formed for the ice between the end of the box and the side of the water or milk tank B, the ice being supported upon an inclined bottom or rack, C, sloping downward toward the tank B, thereby causing the ice at all times to lie snugly up against the side of said tank, a space being left between said bottom C and the bottom of the tank to permit the waste-water to pass off, and also to allow the cold air to pass under the tank. The waste-water falls into a receptacle, D, at the bottom of the box, which receptacle is formed by a partition, e, all as shown in Fig. 1.

By this arrangement of the parts the cold air passes from the ice-chamber under the tank from one side and up on the other, and so over the top of the same to the ice again, thus answering the twofold purpose of keeping the water or milk cold without putting ice in it, and also of keeping a strong circulation of cold dry air in the refrigerator, as all dampness and impurities condense upon the ice and run down into the waste-water tank in the bottom, and are drawn off by a faucet, d, thus keeping the air in the refrigerator pure.

A suitable faucet, f, is also provided for the water or milk tank, as indicated in Fig. 2.

I am aware that it has been proposed to construct a refrigerator with a sliding drawer in the top, a downwardly and upwardly projecting ice-floor, the same terminating close to the side of the drawer farthest from the ice-chamber, and with a rigid plate to form the wall of the ice-chamber next to the said drawer, all of which I disclaim; and my invention differs therefrom in the particular construction hereinbefore described, whereby the tank in the top is made to form one wall of the ice-chamber, against which the ice shall rest, the tank being braced both front and rear and supported by cleats, and the ice-floor to terminate below said tank, so as to leave a wide opening between the ice-chamber and main chamber of the box, all for the purposes hereinbefore set forth.

Having described my invention, what I claim is—

The combination of receptacle A, tank B, braced and supported by cleats $a$, inclined floor C, and partition $e$, the several parts being relatively arranged as shown, whereby they form a portion of the ice and the waste-water chambers, and leave spaces such as shown above and below the tank B, all as and for the purposes set forth.

In testimony that I claim the foregoing I have hereunto set my hand and seal this 11th day of April, 1879.

MICHAEL B. TITMAN. [L. S.]

Witnesses:
OLIVER DRAKE,
CHARLES H. PELL.